2,162,429

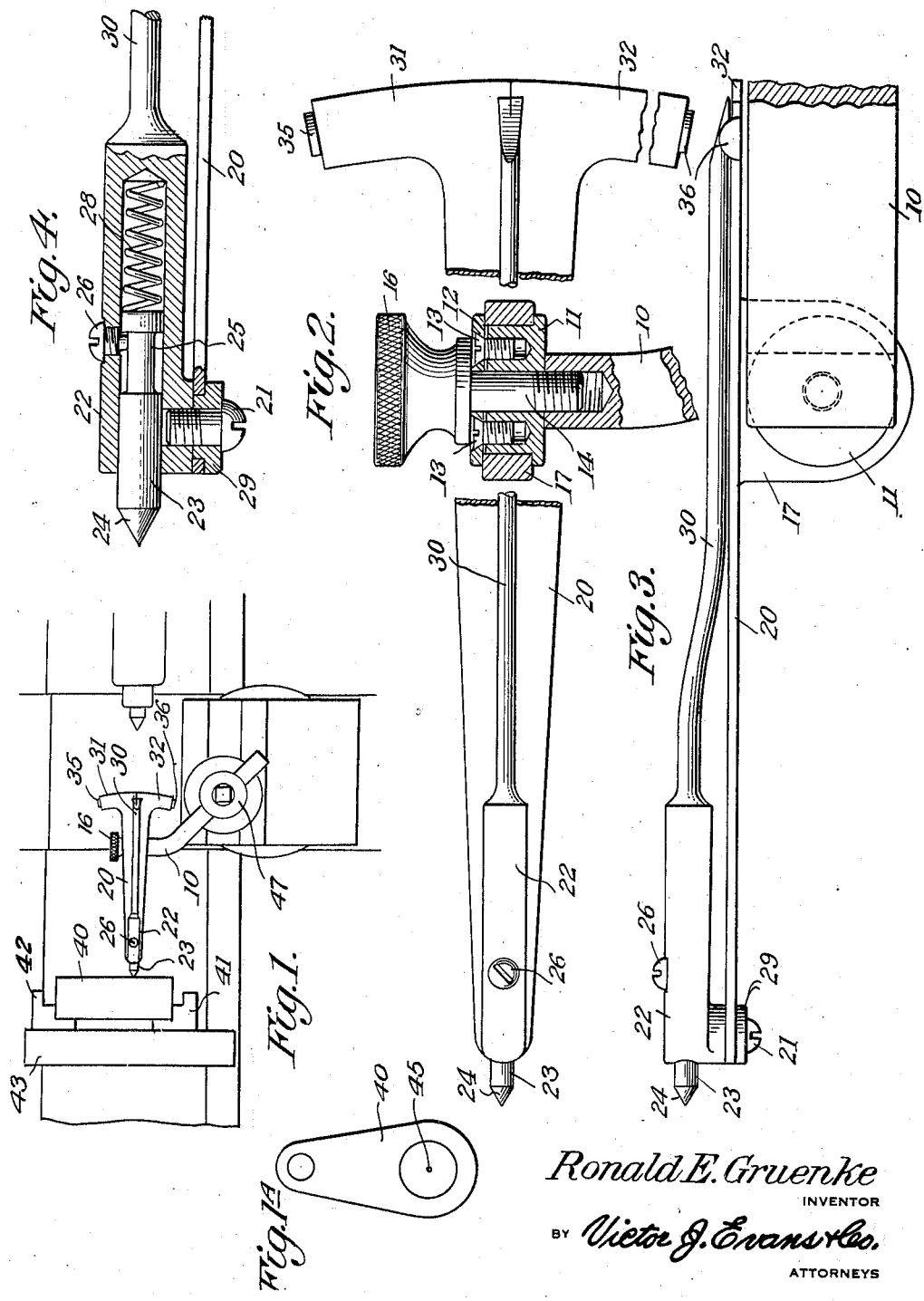
June 13, 1939.    R. E. GRUENKE    2,162,429
TESTING DEVICE
Filed July 8, 1938
Ronald E. Gruenke
INVENTOR
BY Victor J. Evans & Co.
ATTORNEYS Patented June 13, 1939

UNITED STATES PATENT OFFICE 2,162,429

TESTING DEVICE

Ronald E. Gruenke, Michigan City, Ind.

Application July 8, 1938, Serial No. 218,207

2 Claims. (Cl. 33—172)

This invention relates to improvements in testing devices and more particularly to a new and improved testing device useful in facilitating centering of objects in a lathe chuck.

In machine lathe work, it is often difficult to accurately center an object in the chuck particularly when the object to be fastened in the chuck is irregular in shape.

It is among the more important objects of the present invention to provide a device for facilitating centering of irregular shaped objects in the chuck of a lathe or similar machine whereby accurate boring or milling of the object with respect to a punched center point is facilitated.

Another object of the present invention is to provide a tool adapted to being used in existing types of lathes and engageable with the center punch mark of the object being worked upon, whereby essentially accurate centering of the object in a lathe chuck is at least largely facilitated.

Another object of the present invention is to provide a center testing device of the type hereinbefore mentioned, including means for magnifying discrepancy of position between the actual location of the center punch mark on the object and the true center as regards axis of rotation of the chuck, whereby accurate centering of objects in a lathe chuck is at least largely promoted.

A still further object of the instant invention is to provide a center testing device of the type aforesaid, which will be well suited to use by machinists and which will be characterized in not being easily damaged by accidental pressure of the testing device against the object being centered.

An important feature of the novel center testing device according to the present invention is the simplicity and structural ruggedness of the elements thereof: the former well suiting the device to the requirements of mass production and the latter promoting long useful life of the device.

A noteworthy feature of the testing device according to the present invention is that the sensitive tip or feeler thereof, engaging with the center punch mark on the object being mounted in the chuck, is axially slidable whereby the testing device is maintained in cooperating relationship with the object being centered despite small variations in axial position thereof.

Other objects, advantages and features of the device according to the present invention will be apparent to those skilled in the art during the course of the following description.

Regarded in certain of its broader aspects, the present invention comprises a support adapted to being engaged with and mounted on parts of a lathe; a T-shaped member pivotally mounted on said support, free to rotate about an axis essentially perpendicular to the axis of rotation of the object being centered, said T-shaped member being positioned with the central arm thereof pointing toward the object to be centered along the axis of rotation thereof, an indicator member pivotally mounted on the distal end of said central element of the T-shaped member, said indicator member including a spring pressed pointed feeler adapted to engage with the center punch mark of the object being centered, the opposite end of said indicator member being provided with an index cooperating with a scale positioned on the arms of said T-shaped member, whereby rotation of said indicator member on its pivotal mounting is magnified and visibly displayed. The term "feeler" as used in this specification and in the subjoined claims is used to designate a portion of the testing device engaging with the center punch mark in the object to be centered.

In order to facilitate a fuller and more complete understanding of the present invention, a specific embodiment thereof will be hereinafter described, it being clearly understood, however, that the illustrated embodiment is given solely by way of example and is non-limitative upon the scope of the present invention, except as expressed in the subjoined claims.

Referring then to the drawing:

Figure 1 is substantially a top plan view of a portion of a lathe illustrating use of the device according to the instant invention.

Figure 1a is substantially a front elevational view of a typical irregularly shaped object which is shown mounted in the chuck of the lathe illustrated in Figure 1.

Figure 2 is a top plan view, partially in section with parts broken away for clearness, of the presently preferred embodiment of the instant invention.

Figure 3 is essentially a side elevational view of the device according to the instant invention with a portion of the mounting shank broken away, and Figure 4 is essentially a fragmentary detail elevational view of a portion of the testing device according to the present invention showing structural features of the feeler element.

Referring now particularly to Figures 2 and 3, it will be noted that the novel center testing device according to the instant invention comprises a mounting shank 10, adapted to being received in and carried by portions of a lathe as will be hereinafter described, said shank carrying a bushing comprising a flanged essentially circular block 11 recessed in the periphery thereof and having attached thereto a plate 12 mounted thereon by fastening means, such as screws 13, engaging with threaded openings in the block 11. The bushing elements 11 and 12 are held in position on the end portion of the shank 10 by means including a threaded member 14 engaging with a tapped opening formed in said shank, said threaded member 14 being provided with a knurled head 16 for facilitating attachment and disengagement of the bushing elements with the shank. An annular member 17 freely rotatably mounted in the recessed peripheral portion of the block 11 and held in position thereon by the plate 12 attached to said block as aforesaid, carries a T-shaped member 20 attached to said annular member 17 at an intermediate locality of the central element of member whereby said T-shaped member is disposed relative to the shank 10, substantially as shown in Figures 2 and 3.

The distal end of the central element of the T-shaped member 20 is provided with an opening adapted to receive pivotal mounting means 21 carrying an essentially cylindrical hollow casing member 22 carrying a pointed feeler member 23 in the end portion thereof substantially as shown in Figures 2 and 3.

Referring now particularly to Figure 4, wherein the details of the feeler mounting members are best illustrated, it will be noted that the feeler 23 presses a rod-like member pointed at one end 24 and having a peripheral groove 25 formed in the opposite end thereof engaging with a stop 26 mounted in the wall of the casing whereby said feeler member 23 is permitted axial motion with said casing 22, the motion of said feeler being limited by engagement of the stop 26 with the sides of the peripheral groove 25. The feeler 23 is normally pressed outwardly from the casing 22 by means of the helical spring 28 pressing against the internal end portion of the member 23 and a closed end portion of the casing. It is to be noted that a grommet 29 is provided on the mounting means 21 whereby the casing 22 is held in engagement with the end portion of the T-shaped member 20 but is permitted rotative motion about the axis of said mounting means.

An indicator arm 30 mounted on the end portion of the casing 22 distal relative to the feeler 23 extends along the T-shaped member 20 to a locality adjacent the cross arms 31 and 32 thereof, substantially as shown in Figures 2 and 3. In the preferred embodiment of the present invention, the indicator arm 30 is provided with an index thereon cooperating with indicia on the cross arms 31 and 32 of the T-shaped member 20 whereby observation of motion of said indicator arm relative to parts of the T-shaped member 20 is at least largely facilitated.

It will be noted that the T-shaped arm 20 is permitted rotative motion relative to the shank 10 and that the indicator arm 30 is pivotally mounted on the fastening means 21 substantially as hereinbefore described, whereby it is possible for the feeler member 23 to describe a circle while the shank 10 is held in fixed position. Motion of the indicator arm 30 on its pivotal mounting is limited by stops 35 and 36 formed on end portions of the cross arms 31 and 32 of the T-shaped member 20.

Referring now particularly to Figures 1 and 1a, wherein the novel testing device hereinbefore described is illustrated in use, it will be noted that an irregularly shaped object 40 mounted between jaws 41 and 42 of a rotatable lathe chuck 43 is positioned with the center punch mark 45 on said piece in engagement with the pointed end portion 24 of the feeler 23, the mounting shank 10 of the testing device being held in a tool post 47 of the lathe substantially as shown. It is to be understood that the working piece 40 has been roughly centered with respect to the axis of rotation of the lathe chuck 43.

It is preferred that when in use the testing device be advanced to the work piece whereby the feeler 23 is pressed inwardly and the stop 26 is positioned between the sides of the slot 25 whereby the feeler is mounted in engagement with the work piece despite small changes in relative position. In use, with the testing device and work piece positioned as hereinbefore described, the lathe chuck or head 43 is rotated and the jaws of the chuck 41 and 42 are adjusted until the indicator arm 30 remains in fixed position relative to indicia on the cross arms of the T-shaped member 20 during rotation of the work piece. It is to be especially noted that small variations from center position of the work piece result in relatively large movement of the indicator arm 20 relative to the indicia on the T-shaped member.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed as new is:

1. A centering test indicator of the type described comprising a supporting shank adapted to being mounted in a lathe tool post; a bushing removably mounted on the distal end of said shank by means including a threaded member passing through an opening formed in said bushing and engaging with a tapped opening in said shank; an annular member freely rotatably mounted on said bushing; a T-shaped frame comprising central element and extending arms, attached to and carried by said annular member at a place intermediate the ends of the central element of said frame; an indicator member pivotally mounted at a place intermediate its length on the free distal end of and substantially coextensive with the central element of said T-shaped frame, the distal end of said indicator member carrying an index cooperating with indicia on the arms of said T-shaped frame for indicating relative positions thereof, and the opposite end of said indicator member carrying a yielding sensitive feeler comprising a spring-pressed rod slidingly mounted in the end portion of said indicator member and having an exposed projecting pointed end portion engageable with a center punch mark in an object to be centered.

2. In combination with a centering test indicator of the type comprising a T-shaped frame having a central element and extending arms, an indicator member pivotally mounted on the free distal end of and substantially coextensive with the central element of the T-shaped frame, an index carried on the distal end of said indicator member cooperating with indicia on arms of said frame for indicating relative positions thereof, the opposite end of said indicator carrying a yielding sensitive feeler engageable with a center punch mark in an object to be centered; a supporting shank, adapted to being mounted in a lathe tool post; the improvement which comprises means for mounting said frame on said shank, said means comprising a bushing removably mounted on the distal end of said shank by means including a threaded member passing through an opening formed in said bushing and engaging with a tapped opening in said shank, and an annular member freely rotatably mounted on said bushing, attached to a central element of said T-shaped frame.

RONALD E. GRUENKE.